US006969429B2

(12) United States Patent
Greverath et al.

(10) Patent No.: US 6,969,429 B2
(45) Date of Patent: Nov. 29, 2005

(54) METHOD FOR REMOVING BLAST MEDIA AND COLORED RESIDUES COMPRISING AN AQUEOUS SLURRY SUSPENSION

(75) Inventors: Wulf-Dieter Greverath, Hamburg (DE); Jens Pöpplau, Hamburg (DE)

(73) Assignee: Muhlhan Surface Protection International GmbH, Hamburg (DE)

( * ) Notice: Subject to any disclaimer, the term of this patent is extended or adjusted under 35 U.S.C. 154(b) by 85 days.

(21) Appl. No.: 10/615,338

(22) Filed: Jul. 8, 2003

(65) Prior Publication Data

US 2005/0005950 A1 Jan. 13, 2005

(51) Int. Cl.[7] ................................................ B08B 5/04

(52) U.S. Cl. ........................... 134/10; 134/13; 134/21; 134/25.1

(58) Field of Search ............................. 134/10, 13, 21, 134/25.1; 15/300.1

(56) References Cited

FOREIGN PATENT DOCUMENTS

| | | |
|---|---|---|
| EP | 1 004 398 A2 | 5/2000 |
| JP | 09155109 | 6/1997 |
| WO | WO 96/16770 | 6/1996 |

*Primary Examiner*—Zeinab El-Arini
(74) *Attorney, Agent, or Firm*—Roberts & Roberts, LLP

(57) ABSTRACT

A process for removing an aqueous slurry suspension comprising a blast medium and coating substance residues which produced when cleaning surfaces which have a corrosion protection coating. The process, which is particularly applicable to ships and industrial facilities, involves the steps of
a) suctioning the aqueous slurry suspension by means of an air feed into a receiving tank which has an outside pressure to tank vacuum ratio of more than 1:0.52;
b) diluting the suspension with water;
c) continuous feeding of the diluted suspension by means of a pump overcoming a height differential>5 meters;
d) separating the solids from the water by means of sedimentation in a settling tank; and
e) recycling the separated water.

Suctioning of the aqueous slurry suspension is by means of air into receiving a tank which has a vacuum of at least 0.5 bar with respect to atmospheric pressure, in combination with a pump which continuously feeds the water-diluted suspension over a height differential>5 meters.

18 Claims, 1 Drawing Sheet

METHOD FOR REMOVING BLAST MEDIA AND COLORED RESIDUES COMPRISING AN AQUEOUS SLURRY SUSPENSION

BACKGROUND OF THE INVENTION

1. Field of the Invention

The present invention concerns a process for removing an aqueous slurry suspension comprising blast medium and coating substance residues.

2. Description of the Related Art

One process for removing an aqueous slurry suspension is known from WO 96/16770 A, in which a) the suspension is collected in a receiving tank by means of gravity; b) the feed capacity of the mixture is increased by diluting it with water; c) the diluted mixture is fed to a settling tank by means of a vacuum; d) the (solid) blast medium is separated from the water by sedimentation, and the water is recycled. In addition, this prior known teaching discloses large amounts of water mixed with the blast medium for the purpose of dilution for removal to a further receiving tank to which the mixture to be treated can be fed, if necessary by means of a vacuum from the collection tank, and from which the mixture is further fed to the settling tank.

In EP-A-1 004 398 on the other hand, an aqueous slurry suspension is concentrated under a vacuum in order to separate the suspension.

New processes for cleaning surfaces which have a corrosion protection coating on the surface utilize dripable fluids (e.g. water), in addition to the dry abrasives from sandblasting. In contrast to dry blasting, in which the abrasive-coating substance-rust mixture can be easily removed by vacuuming, in wet blasting a slurry of abrasive material, surface residues and liquid is created, with a volume proportion of 10%–40% solid material. A separation of solids and fluids occurs in practice due to gravity, such that a process is required which must be capable of removing from the work area a broad spectrum of residues with from less than 5% to more than 90% solids. This is made more difficult on ships, for example, where access to the work area is limited by manholes of about 600 mm diameter and the required feed height can be more than 30 meters.

The invention is therefore based on achieving a process for optimal suction capable of collecting and then feeding a broad spectrum of slurry materials with abrasive components distributed over a wide work area over height differentials of up to 30 meters and more.

The five-phase process according to the invention begins with the initial suction of the aqueous slurry suspension into a receiving tank in which a further dilution with water is required to achieve a feed capability of the diluted suspension which can then, by means of a pump, overcome a height differential of at least 5 meters. Then, according to the invention, the solid material is separated from the water by simple sedimentation, and the water is recycled.

The use of the inventive device on ships, where particular spatial limitations must be observed, is a further aspect of the invention. According to the invention a housing with a diameter <600 mm is advantageous for this purpose.

SUMMARY OF THE INVENTION

The invention provides a process for removing an aqueous slurry suspension, comprising a blast medium and coating substance residues, produced when cleaning surfaces having a corrosion protection coating on the surfaces which comprises:

a) suctioning the aqueous slurry suspension comprising a blast medium and coating substance residues into a receiving tank by an air feed;

b) diluting the suspension with water under vacuum in the receiving tank;

c) feeding the diluted suspension by means of a pump into a settling tank, c) separating a solids materials portion of the suspension from the water by sedimentation, and e) recycling the separated water, wherein the suctioning of the aqueous slurry suspension into the receiving tank is conducted with a vacuum, wherein a pressure ratio of outside pressure to receiving tank pressure is 1:0.52 or more, whereby the aqueous suspension is diluted to a solid materials proportion of a maximum of about 10% by volume, and wherein the diluted suspension is fed continuously to the settling tank and overcomes a height differential of at least about 5 meters.

The invention also provides an apparatus for removing an aqueous slurry suspension, comprising a blast medium and coating substance residues, produced when cleaning surfaces having a corrosion protection coating on the surfaces which comprises:

a) a device for suctioning the aqueous slurry suspension comprising a blast medium and coating substance residues into a receiving tank by an air feed;

b) a device for diluting the suspension with water;

c) a device for feeding the diluted suspension by means of a pump into a settling tank, c) a device for separating a solids materials portion of the suspension from the water by sedimentation, and e) a device for recycling the separated water, wherein the device for suctioning of the aqueous slurry suspension into the receiving tank is comprises a vacuum generator which generates a pressure ratio of outside pressure to receiving tank pressure of 1:0.52 or more, and wherein the aqueous suspension is diluted to a solid materials proportion of a maximum of about 10% by volume, and wherein the diluted suspension is capable of being fed continuously to the settling tank and capable of overcoming a height differential of at least about 5 meters.

A preferred form of the invention is described in more detail below in reference to the drawing. It is evident that the invention is not limited to this form.

DETAILED DESCRIPTION OF THE PREFERRED EMBODIMENT

Figure 1:
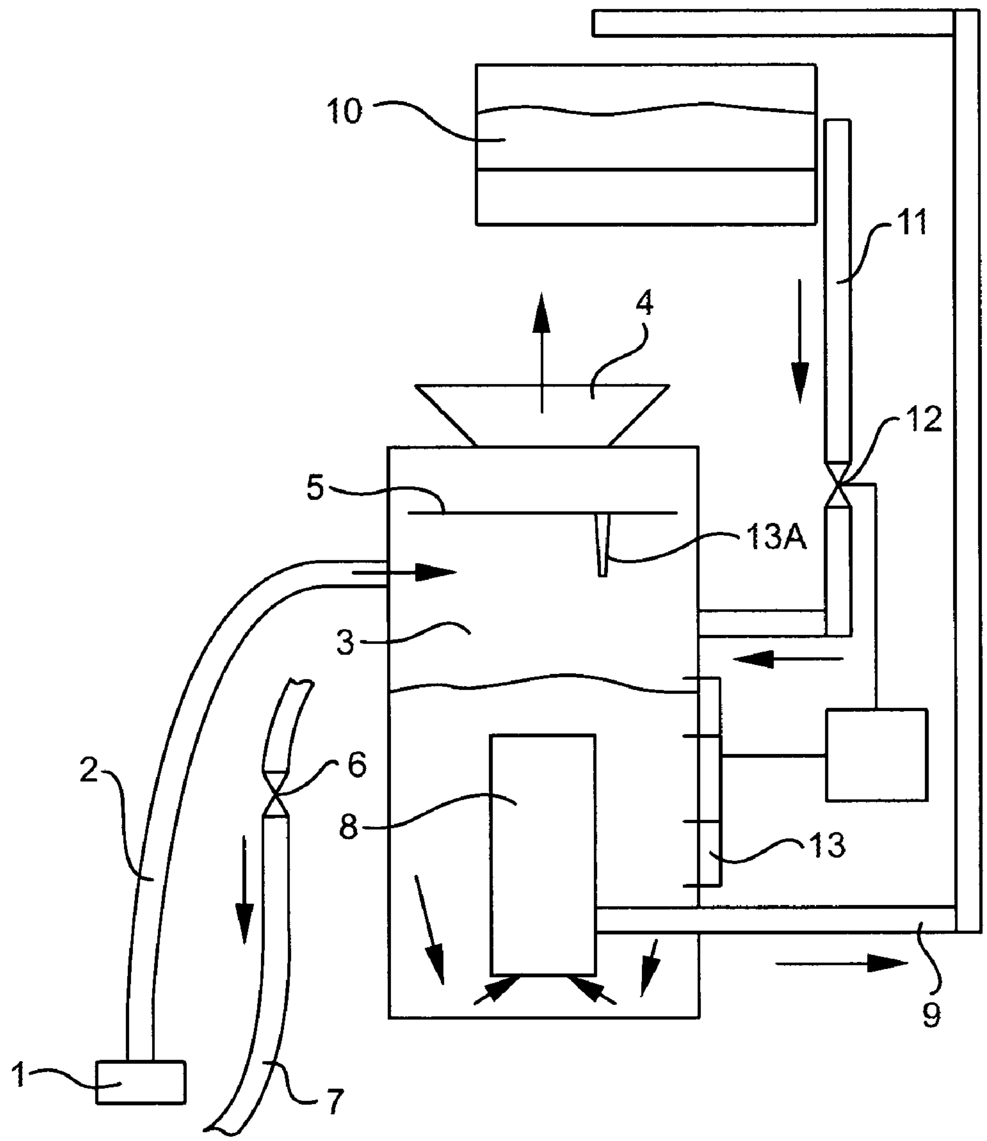
FIG. 1 is a schematic diagram of a device with which the inventive process can be carried out.

FIG. 1 shows a suction nozzle 1, which utilizes a suction hose 2, to suction an aqueous slurry suspension which comprised of a slurry-coating substance-water mixture (not shown), by means of an air feed into a suction or receiving tank 3. The driving force for this step is a vacuum in the receiving tank 3 relative to entry at suction nozzle 1. Preferably the vacuum in the receiving tank is at least 0.5 bar with respect to atmospheric pressure. Preferably the pressure relationship of the outside, i.e. atmospheric pressure to tank pressure is about 1:0.52 or more (critical pressure relationship) since then precisely the maximal obtainable air velocity (sound velocity of the air ca. 300 m/s) is reached in the suction hose 2.

The vacuum is created by means of a vacuum assembly or vacuum generator 4 (for example an injector) or by means of an external connector 4 to a corresponding vacuum assembly. Gravity causes the suctioned suspension to fall into the tank sump below; an appropriately located plate-type air deflector 5 prevents the direct suctioning into the vacuum assembly 4.

In the event the proportion of solid material is too high for the suction nozzle 1, fluid can be added by means of a valve 6 on a nozzle 7 (as shown as a separate part of FIG. 1), thus improving the feed capacity. The fluid can come from the circulation of the process liquid to be described below or also for example from a high pressure cleaner.

The suctioned suspension is not usually directly pumpable at a mean solids proportion of 30% by pumps typically used for slurry feeding. At this proportion of solids there is the danger of clogging the pump 8, and the abrasives lead to heavy wear. For this reason circulating water is added that limits the solids to about 3% to about 10% by volume. The circulation works continuously in that the diluted suspension from the vacuum area is pumped into the normal pressure area at the required feed via the delivery pipe 9 and the pump 8. Suitable pumps include diaphragm pumps and centrifugal pumps. There the mixture falls into a sediment tank 10. The solids settle and the now largely solid-free fluid flows through an overflow return 11 back into the receiving tank 3.

In the delivery pipe 9 in a multistage manner comprising further pump stages, comprised of an open tank and an upper level controlled slurry pump, can be built-in at varying geodetic heights, reducing the required effort and thus the size/weight of the individual pumps.

The sediment tank 10 can be fitted with a bag (not shown) to collect waste solids. The pump 8 and the vacuum generator 4 may run continuously.

A valve 12 controls fluid return. Output controllers are digital liquid level sensors 13 or an analog signal of a gap sensor 13*a*. It is possible to control the fluid level purely mechanically by means of a float.

The assurance that a certain proportion of solids is not exceeded is possible by the selection of pipe dimension for pipes 9 and 11 in conjunction with the cross-section of the suction hose 2. Given appropriate design, the process is simply adjusted at valve 12.

A typical design with a 50 mm suction hose 2, a 50 mm pump delivery pipe 9 and a 70 mm return feeds ca. 25,000 kg of solid material in 24 hours over a height of 30 m at a pump capacity of 5 kW. The achievable pump height depends on the pressure difference the pump is able to supply. A typical value for a diaphragm pump is about 6 bar. This total pressure difference is divided into the vacuum pressure in the suction or receiving tank (about 0.5 bar), the geodetic pressure of the pump height (about 1 bar per 10 meters height) and the pressure lost due to pipe friction (about 0.6 bar per 10 meters hose length). For a pump height of 30 meters and a hose length of 40 meters, the pump has to supply a pressure difference of 5.9 bar. In case of exceeding the pump capacity, pumping has to be done stepwise. In this case, the vacuum pressure doesn't occur in the following steps. With horizontal pumping (no geodetic pressure), hose lengths of about 100 meters are possible for the first step.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A process for removing an aqueous slurry suspension, comprising a blast medium and coating substance residues, produced when cleaning surfaces having a corrosion protection coating on the surfaces, which process comprises a) suctioning the aqueous slurry suspension comprising a blast medium and coating substance residues into a receiving tank by an air feed;

b) diluting the suspension with water under vacuum in the receiving tank;

c) feeding the diluted suspension by means of a pump into a settling tank, d) separating a solid materials portion of the suspension from the water by sedimentation, and e) recycling the separated water, wherein the suctioning of the aqueous slurry suspension into the receiving tank is conducted with a vacuums wherein, a pressure ratio of outside pressure to receiving tank pressure is 1:0.52 or more, whereby the aqueous suspension is diluted to a solid materials proportion of a maximum of about 10% by volume, and wherein the diluted suspension is fed continuously to the settling tank and overcomes a height differential of at least about 5 meters.

2. The process according to claim 1 in which the pump utilized in step c) is a centrifugal pump or diaphragm pump.

3. The process according to claim 2 in which the suspension in step b) is diluted with water to a solid materials proportion of about 5% by volume.

4. The process according to claim 3 in which the pumping of step c) is accomplished in a multistage manner.

5. The process according to claims 2 in which the continuous feeding in step c) overcomes a height differential of about 30 meters or more.

6. The process according to claim 5 in which the pumping of step c) is accomplished in a multistage manner.

7. The process according to claim 2 in which the pumping of step c) is accomplished in a multistage manner.

8. Process according to claim 1 in which the suspension in step b) is diluted with water to a solid materials proportion of about 5% by volume.

9. The process according to claims 8 in which the continuous feeding in step e) overcomes a height differential of about 30 meters or more.

10. The process according to claim 9 in which the pumping of step c) is accomplished in a multistage manner.

11. The process according to claim 8 in which the pumping of step a) is accomplished in a multistage manner.

12. The process according to claim 1 in which the continuous feeding in step c) overcomes a height differential of about 30 meters or more.

13. The process according to claim 12 in which the pumping of step c) is accomplished in a multistage manner.

14. The process according to claim 1 in which the pumping of step c) is accomplished in a multistage manner.

15. Process according to claim 1 in which the suspension in step b) is diluted with water to a solid materials proportion of from about 3% to about 10% by volume.

16. Process according to claim 1 in which the receiving tank has a vacuum of at least 0.5 bar wit respect to atmospheric pressure.

17. Process according to claim 1 in which the suspension in step a) prior to dilution has a solid materials proportion of from about 10% to about 40% by volume.

18. A process for removing an aqueous slimy suspension, comprising a blast medium and coating substance residues, produced when cleaning surfaces having a corrosion protection coating on the surfaces, which process comprises the steps of:

a) suctioning the aqueous slurry suspension comprising a blast medium and coating substance residues into a receiving tank by an air feed, with a diaphragm pump of about 6 bar and a hose of about 40 meters;

b) diluting the suspension with water under vacuum in the receiving tank;

c) feeding the diluted suspension by means of a pump into a settling tank, d) separating a solid materials portion of the suspension from the water by sedimentation, and e) recycling he separated water, wherein the suctioning of the aqueous slurry suspension into the receiving tank is conducted with a vacuum, wherein a pressure ratio of outside pressure to receiving tank pressure is 1:0.52 or more, whereby the aqueous suspension is diluted to a solid materials proportion of a maximum of about 10% by volume, and wherein die diluted suspension is fed continuously to die settling tank overcomes a height differential of about 30 meters.

* * * * *